United States Patent [19]

Chuman et al.

[11] Patent Number: 5,494,778
[45] Date of Patent: Feb. 27, 1996

[54] OPTICAL RECORDING MEDIUM

[75] Inventors: Takashi Chuman, Tsurugashima; Takashi Yamada, Tsurugashima; Shingo Iwasaki, Tsurugashima; Toshiyuki Miyadera, Tsurugashima, all of Japan

[73] Assignee: Pioneer Electronic Corporation, Tokyo, Japan

[21] Appl. No.: 126,979

[22] Filed: Sep. 24, 1993

[30] Foreign Application Priority Data

Oct. 1, 1992 [JP] Japan .................................. 4-263500

[51] Int. Cl.⁶ .................................................. G11B 7/24
[52] U.S. Cl. .................. 430/271.1; 430/945; 369/283; 369/284
[58] Field of Search ............................. 430/273, 495, 430/945, 271; 428/64; 369/283, 288, 284

[56] References Cited

U.S. PATENT DOCUMENTS

| | | | |
|---|---|---|---|
| 4,975,310 | 12/1990 | Nagano | 428/64 |
| 5,013,594 | 5/1991 | Mizumura et al. | 428/64 |
| 5,236,755 | 8/1993 | Howe et al. | 428/64 |
| 5,279,877 | 1/1994 | Uchiyama et al. | 428/64 |
| 5,311,500 | 5/1994 | Higuchi et al. | 369/288 |

FOREIGN PATENT DOCUMENTS 59-168946  9/1984  Japan .................................. 369/288

*Primary Examiner*—Charles L. Bowers, Jr.
*Assistant Examiner*—John A. McPherson
*Attorney, Agent, or Firm*—Kane, Dalsimer, Sullivan, Kurucz, Levy, Eisele and Richard

[57] ABSTRACT

An optical recording medium which has a recording medium and a light reflective film on a substrate. A top coat film made of organic material for adjusting reflectivity is formed on a surface of the substrate opposite to the other surface on which the at least one of the recording film and the light reflective film is formed. A reflectivity is remarkably enhanced without any adverse affect to a tracking error and an error rate. Also, it is easy to form the top coat. The top coat has an excellent weatherproof property.

7 Claims, 1 Drawing Sheet

RECORDING/REFLECTIVE LIGHT

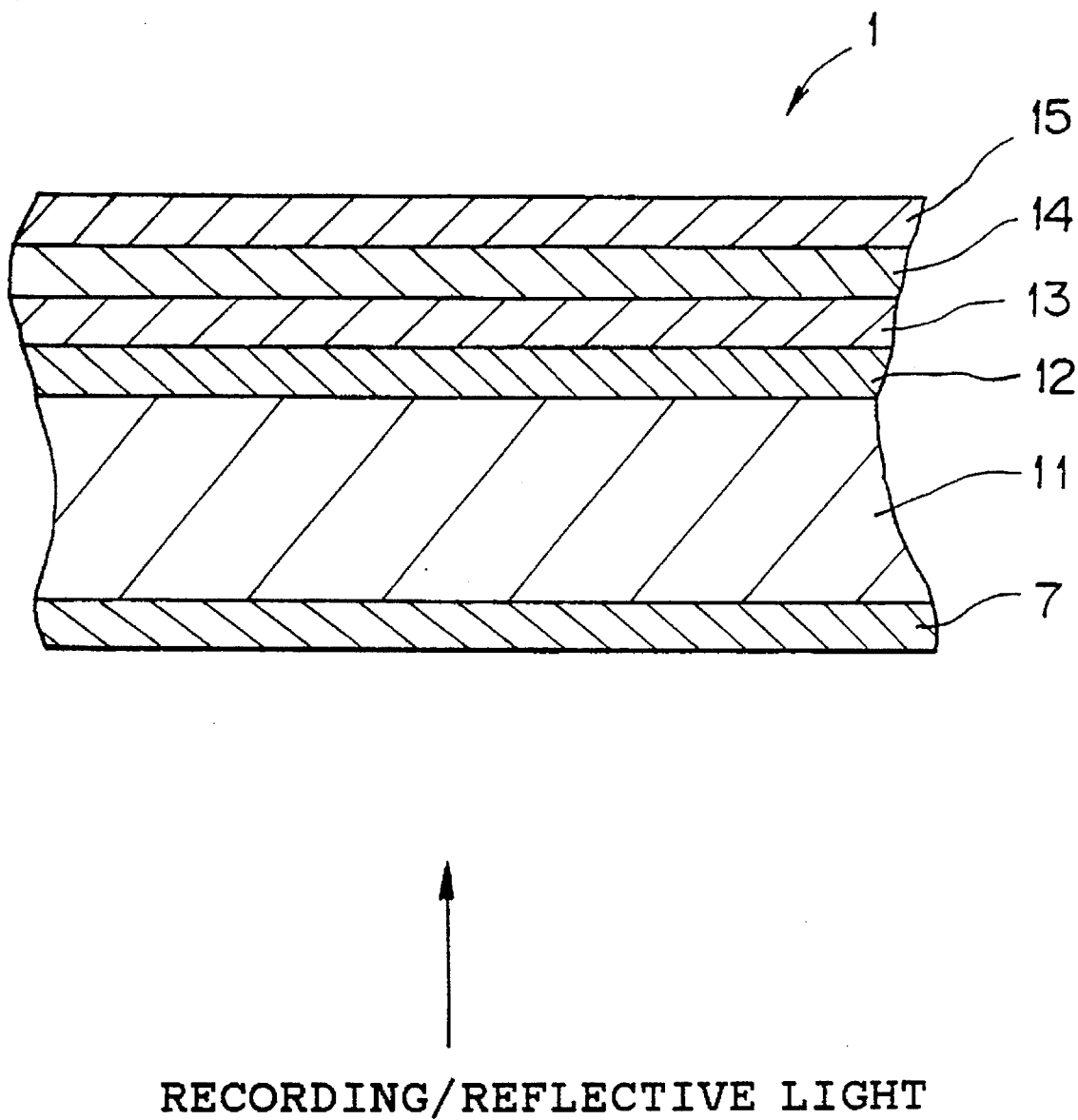
RECORDING/REFLECTIVE LIGHT

OPTICAL RECORDING MEDIUM

BACKGROUND OF THE INVENTION

The present invention relates to a writable/readable optical recording medium, and more particularly to an improvement in reflectivity of an optical recording medium which has either one or both of a recording layer and a light reflective layer on an optically transparent substrate.

It is generally well known that organic dyes such as cyanine or phthalocyanine dyes are used in a recording film of a so-called "writable" or "rewritable" optical recording medium.

In a method for writing information signals on such a rewritable optical recording medium, a laser beam is converged onto a fine area of a recording film and is adapted to be converted into a thermal energy to thereby change characteristics of the recording film (i.e., to form pits). In order to perform a smooth change of the characteristics of the recording film, it is general to take a so-called air-sandwich structure such that two pieces of substrates on which recording films are formed are provided for a recording medium and the substrates are coupled together with their recording medium facing each other.

A "write" laser beam used for such a type of the rewritable optical recording medium is projected from a transparent substrate side so that optically readable pits are formed in the recording films. The "read" laser beam for reproducing recorded information data has a smaller output power than that of "write" laser beam, and a contrast between an area where the pits are formed and another area where no pits are formed is read out as an electric signal.

On the other hand, there is a so-called ROM (Read Only Memory) type medium in which information data have been recorded in advance unlike the above-described recording medium. This type recording medium has been widely used in fields of audio signal recordation and information data processor. In this case, prepits corresponding to data to be reproduced have been formed on plastic substrates through a press process in advance, reflective layers made of metals such as Au, Ag, Cu and Al are formed on the substrate, and further protective layers are formed thereon. A typical medium of this ROM type is a compact disc which is generally referred to as CD. A specification of recording and reading signals for CDs is standardized. A compact disc player (CD player) has been widely used as a CD playback system essentially in accordance with the standards.

By the way, the writable or rewritable recording medium is common with the CDs in using laser beams and also in shape of medium, i.e., disc shape. In view of this fact, a writable medium which conforms with the CD standards and is capable of being used in CD players without any change has been vigorously developed.

Conventionally, in order to obtain a high reflectivity in conformity with the CD standards, for example, the materials for the recording films and the reflective films are changed or modified, or discrete enhance films are interposed between the recording and reflective films. However, there is a limitation against the enhancement of the reflectivity by selection of the reflective film material, and it would be very difficult to change the recording films per se. Moreover, in the case where the enhance film is used, although it would be possible to enhance the reflectivity to some extent, this causes a tracking error and an error rate to deteriorate.

On the other side, another attempt has been made. For example, an anti-reflective film made of inorganic compounds such as magnesium fluoride and cryolite is provided on one side of the substrate to reduce a light quantity loss as much as possible and to perform a high efficiency recordation and playback.

However, since such an attempt to form the anti-reflective films requires large scale equipment such as a vacuum system for depositing or sputtering, it would not be easy to form the anti-reflective films. It is general that resins such as PMMA, PC and the like are used for the substrates from a productive point of view. In this case, if the substrates are left under a high temperature circumstance or a circumstance where a heat change is remarkable, since there is a remarkable difference in expansion coefficient between the substrates and the anti-reflective films, a strain would be generated to cause a crack or a film separation. It would be therefore impossible to enjoy the advantage of the uniform reflectivity with such anti-reflective films.

SUMMARY OF THE INVENTION

An object of the present invention is to provide an optical recording medium which is capable of being produced with simple equipment to have a high weatherproof property as well as a high reflectivity.

In order to attain this and other objects, according to the present invention, there is provided an optical recording medium which comprises a recording film and a light reflective film on a substrate, wherein a top coat film made of organic material for adjusting reflectivity is formed on a surface of the substrate opposite to the other surface on which the recording film and the light reflective film are formed.

According to the present invention, there is provided an optical recording medium which comprises a recording film on a substrate, wherein a top coat film made of organic material for adjusting reflectivity is formed on a surface of the substrate opposite to the other surface on which the recording film is formed.

According to another aspect of the present invention, there is provided an optical recording medium which comprises a light reflective film on a substrate, wherein a top coat film made of organic material for adjusting reflectivity is formed on a surface of the substrate opposite to the other surface on which the light reflective film is formed.

With such an optical recording medium, since the top coat film made of organic material for adjusting the reflectivity is formed on a surface of the substrate opposite to the other surface where either one or both of the recording film and the light reflective film are formed, it is possible to considerably enhance the reflectivity without any adverse affect to a tracking error or an error rate. Also, it is easy to form the top coat film. The formed film is superior in physical property with the substrate. For example, even if the recording medium would be left under a high temperature circumstance or a high heat change circumstance, the medium may insure an excellent weatherproof property.

BRIEF DESCRIPTION OF THE DRAWING

FIG. 1 is a cross-sectional view showing one example of an optical recording medium according to the present invention.

DESCRIPTION OF THE PREFERRED EMBODIMENTS

A medium according to the present invention which is writable as an optical recording medium in conformity with the CD standards will be described with reference to FIG. 1 which shows a cross-section of the medium.

As shown in FIG. 1, the optical recording medium 1 according to the invention has a substrate 11 made of transparent material, a recording film 12 laid on the substrate 11, an enhance film 13 laminated over the recording film 12, and a light reflective film 14 formed on the enhance film 13. It is preferable that a protective layer 15 be further formed on the light reflective film 14.

The light-transparent substrate 11 is made in the form of a disc. It is preferable that a pregroove for tracking be formed in a concentric or spiral manner on one side of the substrate. From a productive point of view, it is preferable to use, as the substrate 11 with such a pregroove, an integrally formed substrate which is made through injection molding process. The substrate is made of transparent material such as polycarbonate resin (PC), polymethyl methacrylate resin (PMMA) and the like. The substrate is not limited to the integrally formed substrate which is made through injection molding process. It is possible to form the substrate in a so-called 2P (photo-polymer) method. A thickness of the substrate 11 falls within a range of about 1.0 to 1.5 mm.

A top coat film 7 made of organic material for adjusting the reflectivity is formed on a surface of the substrate 11 on the recording/reproducing lightside. The top coat film 7 is made of fluorine system resin or a silicone system resin. The fluorine system resin may be selected from one or more from the group essentially consisting of poly(tetrafluoroethylene), poly(chlorotrifluoroethylene), remarkably enhanced.

On the other hand, the recording film 12 is formed on the other surface of the substrate (i.e., the surface where the top coat 7 is not applied). The recording film 12 contains phthalocyanine dyes.

The phthalocyanine dyes are represented by the following general formula [I]:

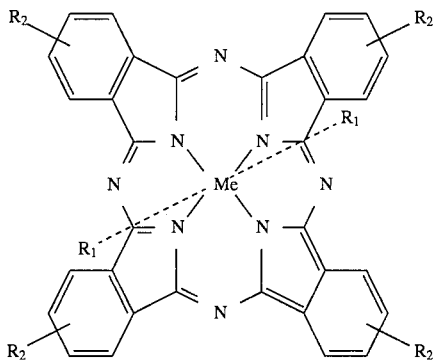

In the chemical formula above, $R_1$ represents an alkyl group being capable of having a substitutent group, a hydrogen element, a halogen element, a hydroxyl group, $-OR^{15}$, $SR^{15}$, $-SeR^{15}$, $TeR^{15}$,

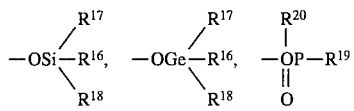

or

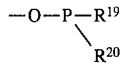

$R^{15}$ represents an unsubstituted or substituted alkyl group, an unsubstituted or substituted aryl group, an unsubstituted or substituted cycloalkyl group or a polyether group.

$R^{16}$, $R^{17}$ and $R^{18}$ may be the same as each other or may be different from each other and represent an unsubstituted or tetrafluoroethylene-hexafluoropropylene copolymer, polyfluoride vinylidene, polyvinylfluoride and the like. The silicone system resin may be selected from polymer having silicon in its main chain such as a silane chain and a siloxan chain.

A thickness t of the top coat film 7 exhibiting such anti-reflective function is selected so as to meet the following equations based upon an optical theory:

$$n_0 t = m\lambda/4,\ m=1,3,5\ldots\ n_0=\sqrt{n_1}$$

where $n_0$ is the refractive index of the top coat film 7, n1 is the refractive index of the substrate, m is the odd integer such as 1, 3, 5, . . . and lambda is the wavelength of the light.

Such a top coat film 7 is produced through a spin coating process by liquefying it while using solvent such as per-fluorotributylamine or the like for the fluorine system resin and by using solvent such as toluene, ligroin or the like for the silicone system resin. After the formation of the film, it is dried while being kept at a temperature of about 80° C. for 5 minutes to 24 hours.

A linear expansion coefficient of the thus produced top coat film is identical in order of digit with that of the resin substrate. Thus, the weatherproof property of the cemented interface between the top coat film and the substrate is substituted alkyl group, an unsubstituted or substituted aryl group, an unsubstituted or substituted alkoxy group, an unsubstituted or substituted aryloxy group, a polyether group, a hydroxyl group or a hydrogen element.

$R^{19}$ and $R^{20}$ may be the same as each other or may be different from each other and represent an unsubstituted or substituted alkyl group and an unsubstituted or substituted aryl group.

$R_2$ represents an alkyl group independently having substitutents, an unsubstituted or substituted alkoxy group, a residue of a heterocyclic group possibly having a substituent, a halogen element, a nitro-group, a cyano-group and a sulfonic acid.

Me represents a metal. It is preferable to select Si, V, Fe Al and the like as Me.

Also, instead of phthalocyanine dye, it is possible to use cyanine dye.

The recording film 12 containing such dye as a main component is applied through a well known manner such as a spin coating process. It is preferable that a thickness of the recording film 12 to be coated be in the range of 10 to 1,000 nm, and more preferably in the range of 100 to 500 nm. If the thickness would be less than 10 nm, the recording sensitivity would be insufficient and it is impossible to perform an ideal recording. Inversely, if the thickness would exceed 1,000 nm, the refractivity would be insufficient.

Various well known solvents may be used as the above-described solvent to be used in coating. For example, it is possible to select one from the group essentially consisting of diacetone alcohol, 2-ethoxyethanol, 2-methoxyethanol, isophorone, methonol, 2,2,3,3-tetrafluolo-1-propanol and the like.

An enhance film 13 may be formed on the recording film 12. The enhance film 13 is formed for the purpose of increasing the reflectivity of a playback beam projected from the substrate. Specifically, the enhance film 13 is made of inorganic material such as magnesium fluoride ($MgF_2$) or organic material such as polyvinyl alcohol. The inorganic material may be formed into a film through a vacuum film forming process such as a vacuum deposition, and the organic material may be formed into a film through a spin coating process or the like. A thickness of the enhance film 13 falls within a range of about 0.01 to 1 microns.

The light reflective film 14 is formed on the enhance film 13. The light reflective film is made of metal such as Au, Al, Ag, Cu and the like. The metal is formed into a film through a vacuum deposition, sputtering, ion plating or the like. The thickness of the light reflective film 14 falls within a range of about 0.02 to 2.0 micorns.

It is preferable to form a protective layer 15 on the light reflective film 14 for protecting the recording film 12, the enhance film 13 and the light reflective film 14. In general, after applying a UV curing resin through a spin coating process, an ultraviolet ray is projected to the film to cure the coating film. The protective layer may be made of material such as epoxy resin, acrylic resin, silicone resin, urethane resin and the like. In general, the thickness of the protective layer 15 falls within a range of about 0.1 to 100 microns.

An intermediate layer may be interposed between the substrate 11 and the recording medium 12 for protecting the substrate 11 against the solvent.

In general, a recording light is projected in a pulsation manner under the condition that the medium is being rotated. At this time, a part of the recording film is dissolved and removed to form pits.

The thus produced pits are to be detected by the detection of the difference in reflective light of the reading light also under the rotation of the medium.

The present invention will be described in more detail with reference to the following experimental examples.

FORMATION OF SAMPLE 1 OF THE INVENTION

The phthalocyanine specified by the following chemical formula was used as a phthalocyanine dye to be contained in the recording film. This was dissolved in an 2-ethoxyethanol solvent and was applied on a substrate 11 of polycarbonate having a diameter of 12 cm to have a thickness of 200 nm to thereby form the recording film 12.

A light reflective film 14 made of Au was formed into a film on the recording film 12 to have a thickness of 1,000 Å through a resistor heating type vacuum deposition process. A protective layer 15 which was made of ultraviolet ray curing type acrylate resin was formed on the light reflective film 14 to have a thickness of 4 microns.

On the other hand, a fluorine resin (Trade Name: Cytop produced by Asahi Glass company) was provided to have a thickness of 1,400 Å as a top coat film on the other surface of the substrate where the recording film was not formed. The Cytop is represented by the following formula.

$$\left[ -CF_2-CF \begin{array}{c} (CF_2)_x \\ \diagup \quad \diagdown \\ \\ \diagdown \quad \diagup \\ O \quad CF_2 \\ \diagdown \quad \diagup \\ (CF_2)_z \end{array} CF-(CF_2)_y- \right]_n \quad \begin{array}{l} x = 0, 1 \\ y = 0, 1 \\ z = 0, 1 \end{array}$$

In forming a film of the top coat film, the Cytop solvent of 5 wt % was applied to the other side surface of the substrate through a spin coating process. The coating had been carried out under the condition of 5,000 rpm for 120 seconds. Thereafter, the film had been baked at 70° C. for 60 minites.

FORMATION OF SAMPLE 2 OF THE INVENTION

The composition of the top coat film of the sample 1 of the invention was changed to "TSHR 100" made by Toray Dow Corning Silicone Ltd. The "TSHR 100" is represented by the following formula.

$$\left( \begin{array}{c} CH_3 \\ | \\ -Si-O- \\ | \\ CH_3 \end{array} \right)_n$$

The other conditions were kept the same to form the sample 2 according to the invention. Incidentally, with respect to the top coat film formation, the coating had been carried out under the condition of 6,000 rpm for 20 seconds. Thereafter the film had been baked at 70° C. for ten minutes.

FORMATION OF COMPARISON SAMPLE

No top coat film had been provided on the sample 1 of the invention. The other conditions were kept the same to obtain the comparison sample.

With respect to these three samples, the record playback was effected under the following conditions and the parameters shown in Table 1 were measured. Recording conditions: L.V.=1.4 m/s, lambda=785 nm, N.A.=0.5

Playback conditions: L.V.=1.4 m/s, lambda=783 nm, N.A.=0.45

11T modulation degree is defined by I11T/ITOP, 3T modulation degree is defined by I3T/ITOP, and the values thus defined were measured and calculated.

ITOP represents a potential at a part where the maximum reflective level was reached in EFM signal, I11T represents a signal amplitude (potential) obtained from the longest pit in EFM signal, I3T represents a signal amplitude (potential) obtained from the shortest pit in EFM signal.

The measurement results are shown in Table 1.

TABLE 1

|  | Sample 1 | Sample 2 | Comparison Sample 1 |
|---|---|---|---|
| reflectivity | 62% R | 59% R | 56% R |
| 11$_T$ modulation degree | 83% | 81% | 81% |
| 3$_T$ modulation degree | 50% | 48% | 48% |
| jitter (pit part) | 27 ns | 27 ns | 27 ns |
| jitter (land part) | 25 ns | 27 ns | 26 ns |
| BLER | 2 × 10$^{-3}$ | 2 × 10$^{-3}$ | 2 × 10$^{-3}$ |
| writing power | 8.0 mW | 8.3 mW | 8.5 mW |

From the results shown in Table 1, it was confirmed that the reflectivity, recording signal modulation degree and the recording sensitivity were enhanced together while suppressing jitters and errors in the samples 1 and 2 of the invention.

Incidentally, in the experimental examples, the phthalocyanine dyes are used by way of example, but it is apparent that the other dyes such as cyanine dyes or the like may be used in the same way. It would be difficult to obtain a sufficient reflectivity with phthalocyanine dyes in comparison with cyanine dyes. In order to enhance the reflectivity, it is very effective to use the top coat film according to the present invention.

In addition, the present invention is effective to further enhance the reflectively also for the reflective film of a recording medium which has a recording portion in advance as in regular CDs.

What is claimed is:

1. An optical recording medium comprising: a substrate; a recording film and a light reflective film formed on said substrate; and a top coat film made of organic material for adjusting reflectivity formed on a surface of the substrate opposite to another surface of said substrate on which at least one of said recording film and said light reflective film is formed, said top coat film having a thickness t that satisfies $$n_0 t = m \frac{\lambda}{4}$$

$$n_0 = \sqrt{n_1}$$

wherein:

$n_0$=refractive index of said top coat film;

$n_1$=refractive index of said substrate;

m=an odd integer; and $\lambda$=wave length of light.

2. The optical recording medium according to claim 1, wherein the organic material forming said top coat film is selected from the group essentially consisting of a fluorine resin and a silicone resin.

3. The optical recording medium according to claim 1, wherein an enhance film is interposed between said recording film and said light reflective film.

4. An optical recording medium comprising: a substrate; a recording film formed on a surface of said substrate; and a top coat film made of organic material for adjusting reflectivity formed on a surface of the substrate opposite to said surface of said substrate on which said recording film is formed, said top coat film having a thickness t that satisfies $$n_0 t = m \frac{\lambda}{4}$$

$$n_0 = \sqrt{n_1}$$

wherein:

$n_0$=refractive index of said top coat film;

$n_1$=refractive index of said substrate;

m=an odd integer; and $\lambda$=wave length of light.

5. The optical recording medium according to claim 4, wherein the organic material forming said top coat film is selected from the group essentially consisting of a fluorine resin and a silicone resin.

6. An optical recording medium comprising: a substrate; a light reflective film formed on a surface of said substrate; and a top coat film made of organic material for adjusting reflectivity formed on a surface of the substrate opposite to said surface of said substrate on which said light reflective film is formed, said top coat film having a thickness t that satisfies $$n_0 t = m \frac{\lambda}{4}$$

$$n_0 = \sqrt{n_1}$$

wherein:

$n_0$=refractive index of said top coat film;

$n_1$=refractive index of said substrate;

m=an odd integer; and $\lambda$=wave length of light.

7. The optical recording medium according to claim 6, wherein the organic material forming said top coat film is selected from the group essentially consisting of a fluorine resin and a silicone resin.

* * * * *